United States Patent
Kitazawa et al.

(10) Patent No.: US 10,564,508 B2
(45) Date of Patent: Feb. 18, 2020

(54) REFLECTION-TYPE DISPLAY PANEL AND METHOD OF PRODUCING THE SAME

(71) Applicant: TOPPAN PRINTING CO., LTD., Taito-ku (JP)

(72) Inventors: Kazushige Kitazawa, Taito-ku (JP); Tomoko Tsuruda, Taito-ku (JP); Yohei Nishikawa, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 53 days.

(21) Appl. No.: 14/628,458

(22) Filed: Feb. 23, 2015

(65) Prior Publication Data

US 2015/0168800 A1 Jun. 18, 2015

Related U.S. Application Data

(63) Continuation of application No. PCT/JP2013/004900, filed on Aug. 19, 2013.

(30) Foreign Application Priority Data

Aug. 21, 2012 (JP) ................. 2012-182595

(51) Int. Cl.
*G02F 1/167* (2019.01)
*G02F 1/1335* (2006.01)
*G02F 1/1676* (2019.01)

(52) U.S. Cl.
CPC ........ *G02F 1/167* (2013.01); *G02F 1/133516* (2013.01); *G02F 1/1676* (2019.01)

(58) Field of Classification Search
CPC ...... G02F 1/167; G02F 5/20; G02F 1/133516; G02F 2001/1676; G02F 2201/52; G02F 2203/02

(Continued)

(56) References Cited

U.S. PATENT DOCUMENTS 4,786,148 A * 11/1988 Sekimura .......... G02F 1/133514
  349/106
2003/0160916 A1* 8/2003 Nakagawa ........ G02F 1/133514
  349/106

(Continued)

FOREIGN PATENT DOCUMENTS

JP 2001-166144 6/2001
JP 2002-258329 9/2002

(Continued)

OTHER PUBLICATIONS

U.S. Appl. No. 14/678,726, filed Apr. 3, 2015, Kitazawa, et al.

(Continued)

*Primary Examiner* — George G King
(74) *Attorney, Agent, or Firm* — Oblon, McClelland, Maier & Neustadt, L.L.P.

(57) ABSTRACT

A reflection-type display panel includes a substrate, a pixel electrode formed on the substrate, a reflection display layer formed on the pixel electrode, a transparent electrode formed on the reflection display layer, and a color filter formed on the transparent electrode and including an ink fixation layer. The color filter has colored portions formed on the ink fixation layer such that the colored portions correspond respectively to driving units of the pixel electrode, and the colored portions each include a coloring composition including a pigment and a binder resin such that a weight ratio of the pigment to the binder resin in each of the colored portions is in a range of from 1:9 to 5:5.

20 Claims, 3 Drawing Sheets

(58) Field of Classification Search
USPC .................................................. 359/296, 267
See application file for complete search history.

(56) References Cited

U.S. PATENT DOCUMENTS

| | | | |
|---|---|---|---|
| 2008/0170187 A1 | 7/2008 | Shimizu et al. | |
| 2008/0277664 A1* | 11/2008 | Kim ..................... | G02F 1/167 257/59 |
| 2010/0260929 A1* | 10/2010 | Fyson .................. | G02B 5/201 427/162 |
| 2011/0176095 A1 | 7/2011 | Fujita et al. | |
| 2012/0094221 A1 | 4/2012 | Shimizu et al. | |
| 2012/0127561 A1 | 5/2012 | Nishida et al. | |
| 2013/0314764 A1* | 11/2013 | Doi ..................... | G02F 1/167 359/296 |
| 2015/0009552 A1 | 1/2015 | Kitazawa | |
| 2015/0092262 A1* | 4/2015 | Greinert ............... | C09C 1/3676 359/296 |

FOREIGN PATENT DOCUMENTS

| | | | |
|---|---|---|---|
| JP | 2003-161964 | 6/2003 | |
| JP | 2007-322602 | 12/2007 | |
| JP | 2008-116895 | 5/2008 | |
| JP | 2010-503895 | 2/2010 | |
| JP | 2011-64944 | 3/2011 | |
| WO | 2010-146810 | 12/2010 | |
| WO | WO2012/108431 | * 8/2012 | ............. G02F 1/167 |

OTHER PUBLICATIONS

International Search Report dated Nov. 5, 2013 in PCT/JP2013/004900 (with English Translation).
Extended European Search Report dated Jan. 5, 2016 in Patent Application No. 13831789.6.
U.S. Appl. No. 14/491,410, filed Sep. 19, 2014, US2015/0009552A1, Kitazawa.
Office Action dated Dec. 12, 2018, in European Patent Application No. 13 831 789.6-1210 (5 pages).

* cited by examiner

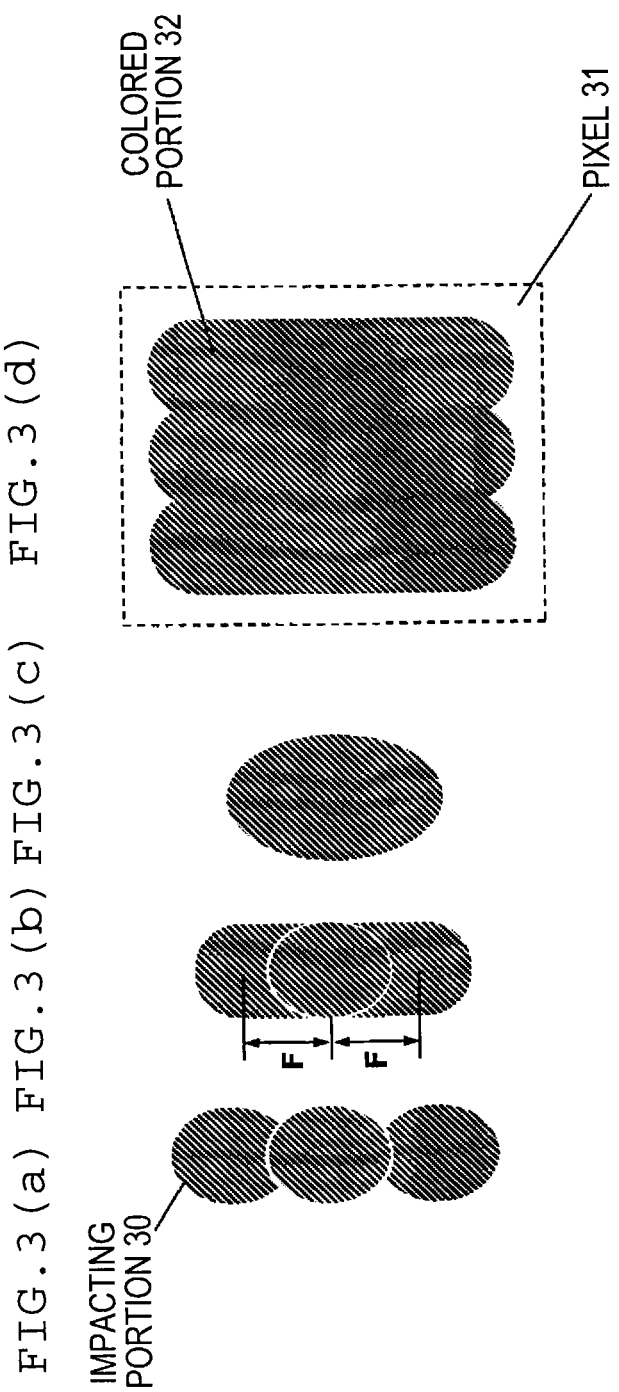

REFLECTION-TYPE DISPLAY PANEL AND METHOD OF PRODUCING THE SAME

CROSS-REFERENCE TO RELATED APPLICATIONS

The present application is a continuation of International Application No. PCT/JP2013/004900, filed Aug. 19, 2013, which is based upon and claims the benefits of priority to Japanese Application No. 2012-182595, filed Aug. 21, 2012. The entire contents of these applications are incorporated herein by reference.

BACKGROUND OF THE INVENTION

Technical Field

The present invention relates to a reflection-type display panel and, particularly, to a reflection-type display panel including an electrophoretic type display device.

Background Art

In recent years, a liquid crystal display panel using backlight has been mainstream as an image display panel, but is not suitable for the usage in which watching a screen for a long period of time is required because the burden on eyes is large.

As a display device with small burden on eyes, a reflection-type display panel including an electrophoretic display layer between a pair of electrodes has been proposed. Since such an electrophoretic type display device displays characters or images using reflected light in the same manner as printed paper, the electrophoretic type display device is suitable for work that needs to watch a screen for a long period of time because the burden on eyes is small.

Recently, two-color display whose main display is white and black display has been main stream due to the structure in the electrophoretic type display device, but a display device which performs multi-color display by providing a color filter formed of pixels having three primary colors of red, green, and blue on an electrophoretic display layer has been proposed (for example, see PTL 1).

In addition, a method of forming a colored area on various surfaces of an electro-optical display or a front plane laminate used for producing such a display using an ink-jet method at the time of colorization of the electrophoretic type display device has been proposed (for example, see PTL 2).

PTL 1: JP-A-2003-161964
PTL 2: JP-T-2010-503895
PTL 3: JP-A-2001-166144

SUMMARY OF INVENTION

According to one aspect of the present invention, a reflection-type display panel includes a substrate, a pixel electrode formed on the substrate, a reflection display layer formed on the pixel electrode, a transparent electrode formed on the reflection display layer, and a color filter formed on the transparent electrode and including an ink fixation layer. The color filter has colored portions formed on the ink fixation layer such that the colored portions correspond respectively to driving units of the pixel electrode, and the colored portions each include a coloring composition including a pigment and a binder resin such that a weight ratio of the pigment to the binder resin in each of the colored portions is in a range of from 1:9 to 5:5.

According to another aspect of the present invention, a method of producing a reflection-type display panel includes forming a pixel electrode on a substrate, forming a reflection display layer on the pixel electrode, forming a transparent electrode on the reflection display layer, and forming a color filter on the transparent electrode. The forming of the color filter includes forming colored portions on an ink fixation layer such that the colored portions correspond respectively to driving units of the pixel electrode, and the colored portions each include a coloring composition including a pigment and a binder resin such that a weight ratio of the pigment to the binder resin in each of the colored portions is in a range of from 1:9 to 5:5.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a) to 3(d) are illustrations for explaining the shape of colored portions of a color filter and an ejection arrangement pattern according to the embodiment of the present invention.

DETAILED DESCRIPTION OF THE EMBODIMENTS

Figure 1:
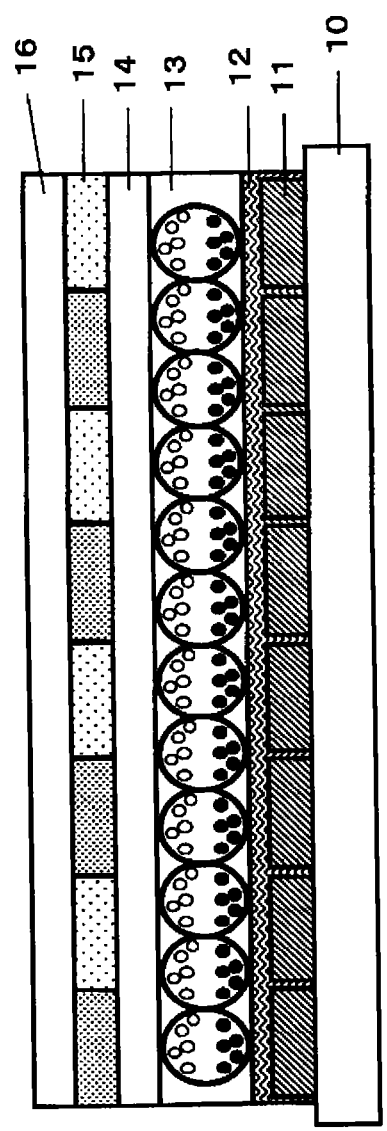
FIG. 1 is a cross-sectional view illustrating an electrophoretic type display device which includes a colored layer (color filter) according to one embodiment of the present invention.

The embodiments will now be described with reference to the accompanying drawings, wherein like reference numerals designate corresponding or identical elements throughout the various drawings.

Hereinafter, embodiments of the present invention will be described in detail.

FIG. 1 is a cross-sectional view illustrating an electrophoretic type display device (reflection-type display panel) which includes a colored layer (color filter) formed of a plurality of colored portions according to one embodiment of the present invention.

The electrophoretic type display device illustrated in FIG. 1 has an electrophoretic display layer (reflection display layer) 13 formed on a substrate 10 which includes a pixel electrode (first electrode layer) 11 having a predetermined pattern on the surface thereof through an adhesive layer 12. The pixel electrode 11 is connected to each of switching elements so that positive and negative voltages can be applied between the pixel electrode 11 and a transparent electrode layer (second electrode layer) 14. The electrophoretic display layer 13 is a layer which fixes a microcapsule, by a binder resin, in which a dispersion medium allowing an electrophoretic element to be dispersed in a dispersion liquid is sealed.

The transparent electrode layer 14, a color filter 15, and a protective film 16 are sequentially laminated on the electrophoretic display layer 13. The color filter 15 is configured as a colored layer including a colored portion (three colors or one or two colors selected from the three colors) and a non-colored portion. In this case, the colored portion and the non-colored portion are provided corresponding to the pattern of the pixel electrode 11.

The electrophoretic display layer 13 is configured by fixing a microcapsule formed by allowing two kinds of particles having different electrical polarities in a shell of the microcapsule to be dispersed in a transparent dispersion medium by a binder resin.

Examples of the two kinds of particles having different electrical polarities include a combination of black particles and white particles. An inorganic pigment such as inorganic carbon, fine powder such as glass or a resin, or the complexes thereof can be used as the black particles. Meanwhile, white inorganic pigment such as known titanium oxide, silica, alumina, or zinc oxide; an organic compound such as vinyl acetate emulsion; or the complexes thereof can be used as the white particles.

The color filter 15 can be formed using photolithography of a colored resist film similarly to a color filter for a liquid crystal display device, but in a case of a color filter used for an electrophoretic reflection-type display device as in the present embodiment, the color filter can be formed by forming an ink fixation layer (receiving layer) on a base and coating the receiving layer with a plurality of coloring compositions (inks). The receiving layer is formed by coating a coating liquid for forming a receiving layer containing a resin. Each of the plurality of colored portions formed by the ink fixation layer being coated with inks is arranged in correspondence with the driving units of the pixel electrode 11.

Examples of the receiving layer to be used include a urethane resin, polyester, an acrylic resin, and a vinyl alcohol resin. In addition, in order to increase absorbability of a solvent of an ink in the receiving layer, a porous substance such as synthetic silica or alumina can be contained therein. When sheet processing is performed, the receiving layer can be formed using a screen printing method, an offset printing method, or a spin coat method, or intermittent coating with a die. Further, when continuous processing from a roll to a roll is performed, the receiving layer can be formed using normal coating techniques such as die coating, comma coating, curtain coating, and gravure coating. In addition, the coated coating liquid for forming a receiving layer is dried. Heating or blowing air can be used as the drying method.

Since separate coating by colors is needed because a black matrix for dividing pixels is not formed, examples of the method of coating the receiving layer of the color filter according to the present embodiment with an ink include a screen printing method, an offset printing method, and an ink-jet printing method. From a viewpoint of easy positioning and high productivity, it is preferable that an ink be ejected to the receiving layer using the ink-jet printing method to form a color filter.

As an apparatus used for an ink-jet printing method, an apparatus with a piezo-conversion system or a heat conversion system is present due to the difference between ink ejection methods thereof, but the apparatus with a piezo-conversion system is preferably used. Further, a granulation frequency of an ink of an ink-jet apparatus is preferably in the range of approximately 5 kHz to 100 kHz. Furthermore, the nozzle diameter of the ink-jet apparatus is preferably in the range of approximately 5 µm to 80 µm. Furthermore, it is preferable that an ink-jet apparatus on which a plurality of heads are arranged and in which approximately 60 to 500 nozzles are incorporated per head be used.

Hereinafter, an operation principle of the electrophoretic reflection-type display device illustrated in FIG. 1 will be described.

When a voltage is applied to the pixel electrode 11, an electric field applied to the microcapsule is changed. In a case where the pixel electrode 11 is a positive electrode, particles which are negatively charged in the microcapsule are moved to the pixel electrode 11 side, and particles which are positively charged are moved to the transparent electrode layer 14 side. In the same manner, in a case where the pixel electrode 11 is a negative electrode, particles which are positively charged in the microcapsule are moved to the pixel electrode 11 side, and particles which are negatively charged are moved to the transparent electrode layer 14 side.

For example, when the pixel electrode 11 is set to a negative electrode with the black particles being positively charged and the white particles being negatively charged, the black particles are moved to the pixel electrode 11 side and the white particles are moved to the transparent electrode layer 14 side as illustrated in FIG. 1. In this case, all light is reflected on a microcapsule layer with the white particles present on the surface thereof, and the light transmitted through the color filter 15 can be observed.

Figure 2:
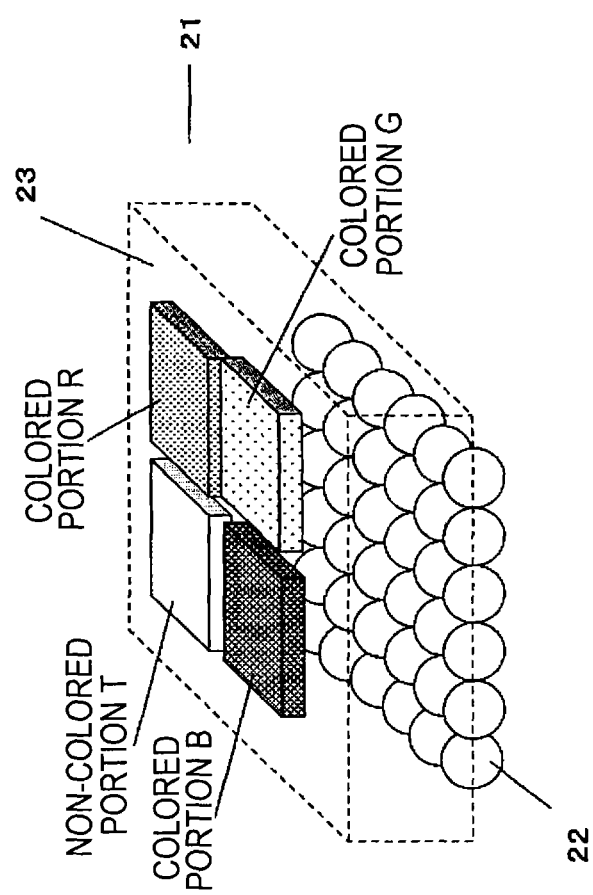
FIG. 2 is an illustration for explaining color display of the electrophoretic type display device according to the embodiment of the present invention.

FIG. 2 is a view for describing color display of the electrophoretic reflection-type display device according to the embodiment of the present invention based on the above-described operation principle. The electrophoretic reflection-type display device 21 has pixels formed of colored portions R, G, and B and a non-colored portion (transparent portion) T on the electrophoretic display layer 22 of white and black display.

In FIG. 2, for example, in a case where only a portion corresponding to the colored portion R of the electrophoretic display layer 22 is set to white display or in a case where portions corresponding to the colored portion R and the non-colored portion T are set to white display, red which is a color of the colored portion R, white which is a color of the non-colored portion T, and black of other pixels (black display) are mixed with each other, and a color which is similar to the color of the colored portion R is displayed. In the same manner, also in a case where portions corresponding to the colored portions G and B are set to white display, a color similar to the color of the colored portion in the same mode is displayed.

In this manner, with regard to the reflection-type display device, when color display is performed through the color filter, white and black are visually recognized by an observer at the same time. Therefore, there is a tendency that color characteristics of color display are degraded without sufficiently exhibiting the color characteristics (brightness, chroma saturation, and the like) of the color filter. In addition, in a case where density unevenness of a color in the colored portion occurs, the color characteristics are more damaged, and attention needs to be paid when a color filter used for the reflection-type display device is formed.

In the present embodiment, the colored portions are formed using an ink-jet printing method, but the colored portions perform arbitrary pattern formation in accordance with an electrode substrate whose electrode wiring is patterned.

At this time, preferably, areas of the colored portions cover the entire pixels and, specifically, have a rectangular shape for improving reproducibility of colors. This is because the corresponding entire pixels are set to white display at the time of display of each color, and accordingly, a color in which the color of the portion (color display) covered by the colored portions is mixed with the color of the portion (white display) which is not covered by the colored portions is observed. Consequently, influence of white which is an achromatic color becomes strong and the chroma saturation at the time of color display becomes significantly decreased as the area of the colored portions in a pixel becomes small.

A ratio of the area of the colored portions occupied in a pixel, that is, the area ratio of the area of the surface coming into contact with the electrophoretic display layers 13 and 22 of the driving units of the pixel electrode 11 to the area of the surface not coming into contact with the ink fixation layer of respective colored portions is preferably in the range of 25% to 90% of the entire pixels and more preferably in the range of 50% to 70%. In a case where the area of the colored portions is 25% or less of the entire pixels, decrease in chroma saturation becomes significant because of the influence of the portion (white display) not covered by the colored portions. Further, in a case where the area of the colored portions is 90% or more of the entire pixels, each of the colored portions in the ink-jet printing method tends to easily come into contact (mixture of colors) with the others and this becomes a cause of defect.

In formation of the colored portions in the ink-jet printing method, since ink droplets become a sphere and the entire pixels having a rectangular shape cannot be efficiently covered with coating performed once, it is necessary to perform coating plural times in some cases.

In regard to a method of forming the colored portions, it is preferable to perform ink-jet ejection arrangement according to the size of the pixels in order for the shape thereof to be close to a rectangle. That is, it is preferable to create a pattern with higher precision from a relationship among the pixel size, droplets, and impact precision. FIG. 3 is a view describing the colored portions and the ejection arrangement pattern according to the embodiment. An ink droplet impacting portion 30 is continuously ejected to create an area of a colored portion in a form of a long hole as illustrated in FIG. 3(b). At this time, since the area becomes a concave shape as illustrated in FIG. 3(a) in a case where an interval F between ink droplets is long and the center portion becomes swollen as illustrated in FIG. 3(c) in a case where the interval F between ink droplets is short, it is preferable to adjust the size of the droplet and the interval F so as to create a vertically linear shape. As illustrated in FIG. 3(d), an arbitrary number of the long holes are horizontally arranged so that a colored portion 32 is formed in a predetermined pixel 31.

In regard to the shape of the colored portion, the size thereof can be arbitrarily formed from the relationship between droplets and impact precision, but the ink is not absorbed into the receiving layer serving as an underlayer immediately after the ink is dropped, and the ink is present as a large droplet in a case of ink coating performed plural times.

Since the ink droplet at this time is in a state in which the ink droplet is swollen in a convex shape, drying (decrease in volatile components) of the ink gradually advances from the periphery of the colored portion. During this time, the ink flows from the center of the colored portion to the periphery of the colored portion due to the difference in the drying speed between the center of the colored portion and the periphery of the colored portion. At this time, the center of the colored portion becomes lighter than the periphery of the colored portion in a case where the fluidity of the ink becomes excellent, and the center of the colored portion becomes darker than the periphery of the colored portion so that density unevenness is generated in the area of the colored portion in a case where the fluidity of the ink becomes degraded.

On the other hand, when the amount of the ink droplets which are dropped by the ink-jet printing method is considered, in a case where the amount of the ink droplets is large, the ink droplet necessarily has a convex shape and it takes time until drying is finished, and thus, density unevenness is generated in the colored portion. Moreover, in a case where the amount of the ink droplets is small, the interval between the ink droplets becomes wide, and accordingly, an appropriate colored portion cannot be obtained because a gap is generated therebetween.

Therefore, when the fluidity of the ink is secured only by dilution and condensation using a solvent (volatile component), since the amount of ink droplets and the drying speed are appropriately changed, it is difficult to improve the density unevenness in the area of the colored portion.

Meanwhile, in a case where the amount of resins in the ink is changed, the fluidity of the ink interlocked with the ink viscosity is changed, the density unevenness in a pixel is not generated when the amount of resins is appropriate with respect to pigments (the ratio of the amount of the resins to the pigments is in the range of 1:9 to 5:5 by weight), and then formation of the colored portion becomes possible.

Moreover, in regard to the color and density required for the color filter, since the reflection-type display panel is a display medium using natural light, the density of each color becomes decreased and a color reproduction area becomes small when compared to a color filter used for the transparent display panel which is represented by a liquid crystal display.

Accordingly, there is a tendency that the pigment which is a coloring component contained in the ink necessarily becomes decreased, but when the amount of resins becomes 90% or more with respect to the pigment, the required amount of droplets becomes increased, the fluidity of the ink becomes degraded because of the influence of increase in the viscosity due to the addition of resins, and the center of the formed colored portion becomes darker than the periphery thereof.

In contrast, since when the amount of resins becomes 50% or less with respect to the pigment, coloring components contained in the ink becomes relatively increased and the color density becomes higher, accordingly, it is necessary to perform dilution in a solvent (volatile component) or formation of the colored portion with a small amount of droplets. As a result, in the case of dilution in a solvent (volatile component), since the fluidity of the ink becomes higher and the amount of ink droplets becomes larger, the periphery of the colored portion becomes darker than the center thereof. In addition, in the case of formation of the colored portion with a small amount of droplets, since the interval between the ink droplets becomes wide, the colored portion with an appropriate shape cannot be obtained due to gaps generated therebetween or the like.

Moreover, in regard to the formation of the colored portion, as described above, it is preferable to form the colored portion so as to cover the entire pixels at the time of performing each color display from a viewpoint of reproducibility of colors. In this case, the interval between the adjacent colored portions is required to be as small as possible. Consequently, when the amount of droplets at the time of formation of the colored portion is large, influence of mixture of colors becomes stronger by the adjacent colored portions coming into contact with each other so that the possibility of failure becomes increased.

The ink for forming the color filter according to the present embodiment is formed using a pigment, a solvent, a binder resin, and a dispersant.

The pigments of the ink can be used regardless of the kinds of pigments such as organic pigments and inorganic pigments. Preferably, organic pigments are exemplified, and particularly, organic pigments with excellent light resistance are preferably used. Specific examples thereof include C. I. Pigment Red 9, 19, 38, 43, 97, 122, 123, 144, 149, 166, 168, 177, 179, 180, 192, 208, 215, 216, 217, 220, 223, 224, 226, 227, 228, 240, and 254; C. I. Pigment Blue 15, 15:3, 15:6, 16, 22, 29, 60, and 64; C. I. Pigment Green 7, 36, and 56; C. I. Pigment Yellow 20, 24, 86, 81, 83, 93, 108, 109, 110, 117, 125, 137, 138, 139, 147, 148, 150, 153, 154, 166, 168, and 185; C. I. Pigment Orange 36 and 73; and C. I. Pigment Violet 23. Further, two or more kinds of materials may be used in combination in order to obtain a desired color.

As a solvent used for the ink, a solvent whose surface tension is 35 mN/m or smaller boiling point is 130° or higher is preferable in consideration of suitability for the ink-jet printing. When the surface tension thereof is 35 mN/m or greater, an adverse effect is significantly brought to stability of a dot shape at the time of ink-jet ejection. Further, when the boiling point thereof is 130° C. or lower, a drying property is remarkably increased in the vicinity of nozzles, and thus, failure such as clogging of nozzles is likely to be generated.

Specific examples thereof include 2-methoxyethanol, 2-ethoxyethanol, 2-butoxyethanol, 2-ethoxyethyl acetate, 2-buthoxyethyl acetate, 2-methoxyethyl acetate, 2-ethoxyethyl ether, 2-(2-ethoxyethoxyl)ethanol, 2-(2-buthoxyethoxy)ethanol, 2-(2-ethoxyethoxyl)ethyl acetate, 2-(2-buthoxyethoxy)ethyl acetate, 2-phenoxyethanol, and diethylene glycol dimethyl ether. However, the examples are not limited to those described above, a solvent which satisfies the above-described conditions can be preferably used, and two or more kinds of solvents may be used in combination if necessary.

Moreover, the amount of components (non-volatile components) other than the solvent contained in the ink is preferably in the range of 10% to 40% and more preferably in the range of 20% to 30% of the entire ink. When the amount of the non-volatile components contained in the ink becomes 10% or less, the coloring components are relatively decreased and the amount of the ink liquid to be dropped is increased. In addition, the fluidity of the ink is increased, and therefore, possibility of causing the density unevenness in the colored portion formed in a pixel or mixture of colors generated by the adjacent colored portions coming into contact with each other is increased. Further, when the amount of non-volatile components contained in the ink is 40% or greater, since the fluidity of the ink is insufficient, the coloring components are relatively increased, and the amount of an ink liquid to be dropped is decreased, a gap between ink droplets is generated in the colored portion formed from a plurality of ink droplets, shape failure is caused, and the density unevenness in the colored portion is generated due to insufficient ink fluidity.

Examples of the binder resin include one or more of curable resins selected from the group consisting of an acrylic resin, a novolac resin, an epoxy resin, and a melamine resin.

Examples of the acrylic resin which is an example of the resin include alkyl (meth)acrylate such as (meth)acrylic acid, methyl (meth)acrylate, ethyl (meth)acrylate, propyl (meth)acrylate, butyl (meth)acrylate, benzyl (meth)acrylate, lauryl (meth)acrylate, hydroxyethyl (meth)acrylate, hydroxypropyl (meth)acrylate, ethoxyethyl (meth)acrylate, and glycidyl (meth)acrylate as a monomer; and alicyclic (meth)acrylate such as cyclohexyl (meth)acrylate, isobornyl (meth)acrylate, and dicyclopentenyl (meth)acrylate as a polymer, but are not limited to the above-described examples. The monomers can be used alone or in combination of two or more kinds thereof. Further, compounds such as styrene, cyclohexylmaleimide, phenylmaleimide, cyclohexylmaleimide, phenylmaleimide, methylmalemide, ethylmaleimide, n-butylmaleimide, and lauryl maleimide which can be copolymerizable with the acrylates can be copolymerized.

In addition, an ethylenically unsaturated group can be added to an acrylic resin. Examples of the method of adding an ethylenically unsaturated group to an acrylic resin include a method of adding a carboxylic acid-containing compound and an ethylenically unsaturated group such as acrylic acid to an epoxy-containing resin such as glycidyl methacrylate; a method of adding epoxy-containing acrylate such as glycidyl methacrylate to a carboxylic acid-containing resin such as methacrylic acid; and a method of adding isocyanate group-containing acrylate such as methacryloyloxyethyl isocyanate to a hydroxyl group-containing resin such as hydroxyl methacrylate, but are not limited to the above-described examples.

Examples of the novolac resin as an example of a resin include a phenol novolac epoxy resin and a cresol novolac epoxy resin.

The epoxy resin can be used without any particular limitation and selected from known resins. The number of the epoxy groups is not particularly limited, but it is preferable to include two or more functional groups and more preferable to include four or more functional groups. Examples thereof include CELLOXIDE 2021P, CELLOXIDE 3000, EHPE-3150 (manufactured by Daicel Chemical Industries, Ltd.), AK601, and EPPN SERIES (manufactured by Nippon Kayaku Co., Ltd.).

The melamine resin can be used without any particular limitation and selected from known melamines. For example, a melamine compound represented by the following general formula (I) is exemplified.

Chem. 1

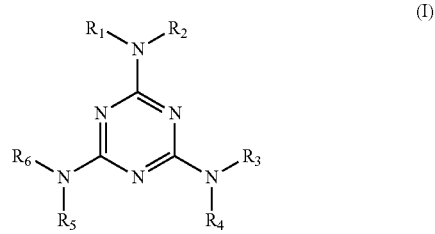

(I)

In the formula, R1, R2, and R3 each represent a hydrogen atom, a methylol group, an alkoxymethyl group, and an alkoxy n-butyl group; R4, R5, and R6 each represent a methylol group, an alkoxymethyl group, and an alkoxy n-butyl group, but it is more preferable that R1 to R6 each represent an alkoxymethyl group and an alkoxy n-butyl group.

A copolymer obtained by combining two or more kinds of repeating units may be used. Two or more kinds of homopolymers or copolymers may be used in combination. Further, a compound described in PTL 3 can be used as a compound including a 1,3,5-triazine ring in addition to those described above. Furthermore, a compound represented by the following general formula (II) is preferably used.

Chem. 2

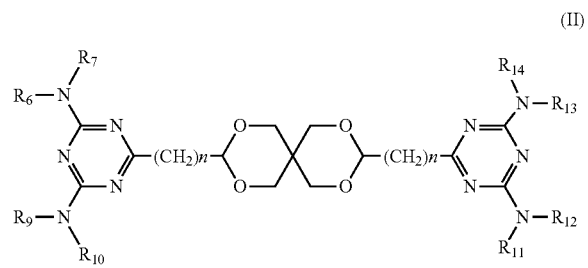

(II)

R7 to R14 each independently represent a hydrogen atom, an alkyl group, an alkenyl group, an aryl group, or a heterocyclic group, and particularly preferably represent a hydrogen atom.

Moreover, the mass average molecular weight of the binder resin is preferably in the range of 500 to 10000 and more preferably in the range of 500 to 8000. When the mass average molecular weight of the binder resin exceeds 10000, the fluidity of the ink at the time performing a drying process of the colored layer 2 becomes insufficient and the density unevenness is generated in the coloring area. In addition, when the mass average molecular weight of the binder resin is less than 500, physical properties such as solvent resistance and heat resistance required for the color filter cannot be satisfied.

A dispersant of a coloring material can be used for improving dispersibility of a pigment to a solvent. As the dispersant, an ionic surfactant, a non-ionic surfactant, and the like can be used. Specifically, the examples thereof include sodium alkylbenzene sulfonate, poly fatty acid salts, fatty acid salt alkyl phosphate, tetraalkyl ammonium salts, and polyoxyethylene alkyl ether in addition to an organic pigment derivative, polyester, and the like. The dispersant may be used alone or in combination of two or more kinds thereof as needed.

The viscosity of the ink is preferably in the range of 1 mPa·s to 20 mPa·s and more preferably in the range of 5 mPa·s to 15 mPa·s. When the viscosity of the coloring material exceeds 20 mPa·s, failure in which the ink does not impact on a predetermined position at the time of ink-jet ejection or failure such as nozzle clogging or the like is likely to be caused. Meanwhile, when the viscosity of the ink is less than 1 mPa·s, a situation in which the ink is scattered is likely to be caused at the time of ejection of the ink.

Hereinafter, a specific example of the present invention will be described.

Example 1

Preparation of Electrophoretic Display Layer

Titanium oxide powder (white particles) whose surface was coated with a polyethylene resin and which had an average particle diameter of 3 μm and carbon black powder (black particles) which was subjected to a surface treatment with alkyl trimethyl ammonium chloride and had an average particle size of 4 μm was dispersed into tetrachloroethylene, thereby obtaining a dispersion liquid. In this case, the white particles were negatively charged and the black particles were positively charged.

The dispersion liquid was sealed in a microcapsule by being O/W-emulsified and by forming microcapsules by a complex and coacervation method using gelatin and gum Arabic. The microcapsules obtained in this manner were screened and the particle diameters thereof were uniformized such that the ratio of microcapsules having an average particle diameter of 60 μm and respectively having particle diameters of 50 μm to 70 μm becomes 50% or greater.

Next, an aqueous dispersion of a microcapsule having a solid content of 40%, by mass was prepared. A coating liquid for forming an electrophoretic layer was prepared by mixing the aqueous dispersion, urethane-based binder (CP-7050, manufactured by Dainippon Ink Co., Ltd.) having a solid content of 25% by mass, a surfactant, a thickener, and pure water. A substrate 10 made of glass, which has a pixel electrode 11 made of ITO formed on the surface thereof, was coated with the coating liquid and then an electrophoretic display layer 13 was formed.

A transparent conductive layer 14 made of ITO was formed on the electrophoretic display layer 13 and continuous coating was performed using a polyester resin-based receiving liquid NS-141LX (Takamatsu Oil & Fat Co., Ltd.) with a comma coater, thereby forming a receiving layer having an average film thickness of 10 μm thereon.

Preparation of Pigment Dispersion Liquid

Next, a coloring material was prepared. Pigments listed in Table 1 were used for coloring pigments contained in the coloring material used to produce a color filter. A red pigment dispersion liquid, a green pigment dispersion liquid, a blue pigment dispersion liquid, and a yellow pigment dispersion liquid were prepared by performing kneading using bead mill dispersion with the formulation listed in Table 1.

TABLE 1

| Pigment dispersion liquid | Solvent | | Dispersant | | Pigment | |
|---|---|---|---|---|---|---|
| | Substance name | Addition amount (parts by weight) | Trade name | Addition amount (pats by weight) | C.I. No. | Addition amount (parts by weight) |
| RED | Propylene glycol monomethyl ether acetate | 70 | SOLSPERSE 20000 (Avecia, Ltd.) | 10 | C.I. Pigment Red 254 | 19 |
| | | | | | C.I. Pigment Yellow 150 | 1 |
| GREEN | Propylene glycol monomethyl ether acetate | 70 | SOLSPERSE 20000 (Avecia, Ltd.) | 10 | C.I. Pigment Green 58 | 15 |
| | | | | | C.I. Pigment Yellow 150 | 5 |
| BLUE | Propylene glycol monomethyl ether acetate | 70 | SOLSPERSE 20000 (Avecia, Ltd.) | 10 | C.I. Pigment Blue 15:6 | 19 |
| | | | | | C.I. Pigment Violet 23 | 1 |

Synthesis of Acrylic Resin 200 g of diethylene glycol monomethyl ether acetate (EDGAc), 140 g of butyl methacrylate (BMA), 30 g of methacrylic acid (MAA), 30 g of hydroxyethyl methacrylate (HEMA), and 4 g of azobisisobutyronitrile (AIBN) were added to a five-necked reaction container having an internal capacity of 2 L and were heated at 80° C. for 6 hours while nitrogen was blown thereto, thereby obtaining an acrylic resin solution (non-volatile component: 50% and molecular weight: approximately 5000).

Preparation of Coloring Material

A binder resin (acrylic resin solution) and an organic solvent were added to the pigment dispersion liquid obtained in this manner and then stirred, thereby preparing eight kinds of coloring materials (inks A to H) for a color filter listed in Table 2.

TABLE 2

| Pigment dispersion liquid | | | Binder resin | | Solvent | | Ink composition | | | |
|---|---|---|---|---|---|---|---|---|---|---|
| Pigment dispersion liquid | Name | Addition amount (parts by weight) | Name | Addition amount (parts by weight) | Name | Addition amount (parts by weight) | Pigment (%) | Amount of binder resin (%) | Ratio of pigment to resin (%) | Non-volatile component (%) |
| Ink A | RED dispersion liquid or | 20 | Acrylic resin | 40 | Diethylene glycol monomethyl ether acetate | 30 | 4 | 20 | 20 | 29 |
| Ink B | GREEN dispersion liquid or | 20 | Acrylic resin | 20 | Diethylene glycol monomethyl ether acetate | 40 | 4 | 10 | 40 | 20 |
| Ink C | BLUE dispersion liquid | 20 | Acrylic resin | 40 | Diethylene glycol monomethyl ether acetate | 80 | 4 | 20 | 20 | 19 |
| Ink D | | 20 | Acrylic resin | 20 | Diethylene glycol monomethyl ether acetate | 90 | 4 | 10 | 40 | 12 |
| Ink E | | 20 | Acrylic resin | 15 | Diethylene glycol monomethyl ether acetate | 43 | 4 | 8 | 53 | 17 |
| Ink F | | 20 | Acrylic resin | 100 | Diethylene glycol monomethyl ether acetate | 10 | 4 | 50 | 8 | 43 |
| Ink G | | 20 | Acrylic resin | 40 | Diethylene glycol monomethyl ether acetate | 0 | 4 | 20 | 20 | 43 |
| Ink H | | 20 | Acrylic resin | 20 | Diethylene glycol monomethyl ether acetate | 140 | 4 | 10 | 40 | 9 |

Formation of Color Filter Layer

Next, an ink-jet printing apparatus on which a head (manufactured by Seiko Instruments, Inc.) with 12 pl and 180 dpi (180 dots per 2.54 cm) was mounted was used with respect to the receiving layer formed on the electrophoretic display layer 13 to adjust the amount of ink ejection of the ink A of the coloring material such that the center of the colored portion had a color (light source C) listed in Table 3, and the area of the colored portion to be formed was adjusted in the same manner, and then a predetermined position of each pixel was coated with the ink. Subsequently, the resultant was dried in a hot air oven at 80° C. for 5 minutes and a color filter 15 formed of respective colored portions (RGB colors) was formed.

TABLE 3

| | x | y | Y |
|---|---|---|---|
| RED | 0.416 | 0.301 | 46.0 |
| GREEN | 0.306 | 0.404 | 84.0 |
| BLUE | 0.192 | 0.226 | 42.0 |

Color Measurement of Colored Portion Measurement of the chromaticity of the colored portion was performed by measuring the center of the formed colored portion using a microscopic spectrophotometer ("OSP-SP200" manufactured by Olympus Corporation, measurement spot diameter: $\phi=20$ μm), and chromaticity (Y, x, y) at a light source C was acquired. Furthermore, glass was used for reference at the time of measurement.

Finally, a protective film 16 was formed on the color filter 15 and an electrophoretic type reflection display was completed.

Color Measurement of Reflection Display Panel

Color measurement at the time of color display by a reflection display obtained by forming a color filter was performed using a spectrocolorimeter ("SE6000" manufactured by Nippon Denshoku Industries Co., Ltd., measurement spot diameter: $\phi=6$ mm) to perform reflection measurement at a light source D65. The color measurement was performed by acquiring reflectance at the time when the entire pixels were set to white and black display, reflectance at the time when pixels of only respective colored portions were set to white display, and chroma saturation thereof.

Examples 2 to 4 and Comparative Examples 1 to 4

Color filters of Examples 2 to 4 and Comparative Examples 1 to 4 were obtained with the combination of the inks and printing conditions listed in Table 4 in the same manner as those of Example 1.

From the results listed in Table 4, the following is evident. That is, in the color filters prepared using the inks described in Examples 1 to 4, the reflectances at the time of white display were approximately 27%, which was constant and the chroma saturations of respective colors in the case of color display of respective colors of Red, Green and Blue became substantially constant, and accordingly, the reflectance and reproducibility of colors which can be assumed from display performance of the electrophoretic type reflection display were satisfied.

In each of the cases of Comparative Examples 1 to 4 other than the above, the colored portion was formed in a state in which the density of the periphery of the colored portion was lower than that of the center of the colored portion in each of Comparative Examples 1 to 3. Accordingly, in a case where an intended color at the center of the colored portion was satisfied, the colored portion was formed in a state in which the color density was practically lower than that of the intended color so that the reproducibility of colors significantly degraded even though the reflectance thereof was higher than that which can be assumed from the reflectance in the electrophoretic type reflection display. Further, in Comparative Example 4, the colored portion was formed in a state in which the color density of the center of the colored portion became higher than that of the periphery of the colored portion. Accordingly, in a case where an intended color at the center of the colored portion was satisfied, the colored portion was formed in a state in which the color density was practically higher than that of the intended color so that the reflectance thereof was significantly decreased compared to assumed reflectance.

Furthermore, in each of Comparative Examples 1 to 4, even in a case where the amount of ink ejection was appropriately changed such that an intended color reproduction area at the time of reflection display or the reflectance is satisfied, the reflectance and the reproducibility of colors were likely to be lower than those of Examples 1 to 4.

multi-color display is performed by providing the color filter having a colored portion with three primary colors of red, green, and blue in respective pixels.

As described above, even though decrease in luminance due to the color filter is significant in the reflection display, when the density is unevenly distributed in the colored portions in each of the pixels, decrease in luminance due to the color filter becomes much more significant.

The present invention has been made in consideration of the above-described problems, and an object thereof is to provide a reflection-type display panel capable of performing bright and vivid color display.

According to a first aspect of the present invention, there is provided a reflection-type display panel which includes at least a substrate, a first electrode layer, a reflective display layer, a second electrode layer, a substrate, and an ink fixation layer in this order, in which a plurality of colored portions formed using coloring compositions each including a pigment, a dispersant, a binder resin, and a solvent are provided on the ink fixation layer, the colored portions are arranged in accordance with driving units of the first electrode layer, and the ratio of the pigment to the binder resin contained in the colored portion is in the range of 1:9 to 5:5 by weight.

According to a second aspect of the present invention, in the reflection-type display panel according to the first aspect, the binder resin is one or more curable resins selected from

TABLE 4

|  | Ink | White reflectance (%) | | Color display (R) | | Color display (G) | | Color display (B) | |
|---|---|---|---|---|---|---|---|---|---|
|  |  | White display | Black display | Reflectance (%) | Chroma saturation (C*) | Reflectance (%) | Chroma saturation (C*) | Reflectance (%) | Chroma saturation (C*) |
| Example 1 | A | 27.0 | 3.2 | 6.3 | 9.0 | 7.3 | 7.6 | 6.4 | 10.9 |
| Example 2 | B | 27.5 | 3.3 | 6.5 | 8.6 | 7.5 | 7.5 | 6.8 | 10.3 |
| Example 3 | C | 26.5 | 3.1 | 6.4 | 8.8 | 7.7 | 7.3 | 6.6 | 10.5 |
| Example 4 | D | 27.1 | 3.2 | 6.0 | 9.3 | 7.0 | 8.0 | 6.2 | 11.5 |
| Comparative Example 1 | E | 29.5 | 3.4 | 7.1 | 5.1 | 8.9 | 4.9 | 7.7 | 7.8 |
| Comparative Example 2 | F | 30.1 | 3.5 | 7.5 | 4.3 | 9.3 | 4.0 | 8.0 | 7.3 |
| Comparative Example 3 | G | 30.5 | 3.4 | 7.3 | 4.4 | 9.1 | 4.2 | 7.9 | 7.2 |
| Comparative Example 4 | H | 22.3 | 3.0 | 4.0 | 10.1 | 5.1 | 9.6 | 4.3 | 12.3 |
| Without color filter layer | — | 45 | 3.4 | — | — | — | — | — | — |

As a method of producing a color filter using an ink-jet system, a method of forming an ink receiving layer formed of a resin composition having an ink absorbing property on a transparent substrate, providing an ink from an ink-jet head with respect to the ink receiving layer to be colored, and forming a colored portion is generally used.

In the above-described method, since an ink spreads into the ink receiving layer and the colored portion is formed, there are cases in which the density of the colored portion tends to increase in the center portion and decrease toward the peripheral portion and in which the density thereof tends to decrease in the center portion and increase toward the peripheral portion.

Meanwhile, since the reflection-type display represented by the electrophoretic type display device performs display using natural light, there is a restriction on luminance (brightness) of a panel, and decrease in the luminance due to a color filter becomes significant particularly in a case where the group consisting of an acrylic resin, an epoxy resin, a novolac resin, and a melamine resin.

According to a third aspect of the present invention, in the reflection-type display panel according to the first or second aspect, the mass average molecular weight of the binder resin is in the range of 500 to 10000.

According to a fourth aspect of the present invention, in the reflection-type display panel according to any one of the first aspect to third aspect, the coloring composition contains components other than the solvent in the range of 10% to 40% of the coloring composition.

According to a fifth aspect of the present invention, in the reflection-type display panel according to any one of the first aspect to fourth aspect, the area ratio of an area of a surface coming into contact with a display layer of the driving units of the first electrode layer to an area of a surface not coming into contact with the ink fixation layer of each of the colored portions is in the range of 25% to 90%.

According to a sixth aspect of the present invention, there is provided a method of producing the reflection-type display panel according to anyone of the first aspect to fifth aspect, in which the colored portion is formed using an ink-jet method.

There is provided a reflection-type display panel which includes the above-described colored portion in one driving unit (pixel) of an electrode layer in a display panel and is capable of performing bright and vivid color display.

INDUSTRIAL APPLICABILITY

The present invention can be applied to a display device such as electronic paper or the like.

DESCRIPTION OF REFERENCE NUMERALS

10: SUBSTRATE
11: PIXEL ELECTRODE
12: ADHESIVE LAYER
13, 22: ELECTROPHORETIC DISPLAY LAYER
14: TRANSPARENT ELECTRODE LAYER
15, 23: COLOR FILTER
16: PROTECTIVE FILM
21: ELECTROPHORETIC REFLECTION-TYPE DISPLAY
30: IMPACTING PORTION
31: PIXEL
32: COLORED PORTION

Obviously, numerous modifications and variations of the present invention are possible in light of the above teachings. It is therefore to be understood that within the scope of the appended claims, the invention may be practiced otherwise than as specifically described herein.

The invention claimed is:

1. A reflection-type display panel, comprising:
a substrate;
a pixel electrode formed on the substrate;
a reflection display layer formed on the pixel electrode;
a transparent electrode formed on the reflection display layer; and
a color filter formed on the transparent electrode and including an ink fixation layer,
wherein the color filter has a non-colored portion and a plurality of colored portions formed on the ink fixation layer such that the colored portions correspond respectively to driving units of the pixel electrode, and the colored portions each comprise a coloring composition including a pigment and a binder resin such that a weight ratio of the pigment to the binder resin in each of the colored portions is in a range of from 1:9 to 5:5,
wherein light is permitted to pass unfiltered in a space between the plurality of colored portions,
wherein reflectance at a time of white display is between 26.5% and 27.5%, and
wherein chroma saturation at a time of display is R equal to 8.6-9.3, G equal to 7.3-8.0 and B equal to 10.3-11.5.

2. The reflection-type display panel according to claim 1, wherein the binder resin comprises at least one curable resin selected from the group consisting of an acrylic resin, an epoxy resin, a novolac resin, and a melamine resin.

3. The reflection-type display panel according to claim 1, wherein the binder resin has a mass average molecular weight in a range of from 500 to 10000.

4. The reflection-type display panel according to claim 2, wherein the binder resin has a mass average molecular weight in a range of from 500 to 10000.

5. The reflection-type display panel according to claim 1, wherein the coloring composition has a non-volatile content in a range of from 10% to 40%.

6. The reflection-type display panel according to claim 2, wherein the coloring composition has a non-volatile content in a range of from 10% to 40%.

7. The reflection-type display panel according to claim 1, wherein the coloring composition further comprises a dispersant and a solvent.

8. The reflection-type display panel according to claim 1, wherein the colored portions cover from 25% to 90% of an area of each of the driving units of the pixel electrode.

9. The reflection-type display panel according to claim 2, wherein the colored portions cover from 25% to 90% of an area of each of the driving units of the pixel electrode.

10. The reflection-type display panel according to claim 3, wherein the colored portions cover from 25% to 90% of an area of each of the driving units of the pixel electrode.

11. The reflection-type display panel according to claim 5, wherein the colored portions cover from 25% to 90% of an area of each of the driving units of the pixel electrode.

12. The reflection-type display panel according to claim 5, wherein the colored portions cover from 50% to 70% of an area of each of the driving units of the pixel electrode.

13. A method of producing a reflection-type display panel, comprising:
forming a pixel electrode on a substrate;
forming a reflection display layer on the pixel electrode;
forming a transparent electrode on the reflection display layer; and
forming a color filter on the transparent electrode,
wherein the forming of the color filter includes forming a non-colored portion and a plurality of colored portions on an ink fixation layer such that the colored portions correspond respectively to driving units of the pixel electrode, and the colored portions each comprise a coloring composition including a pigment and a binder resin such that a weight ratio of the pigment to the binder resin in each of the colored portions is in a range of from 1:9 to 5:5,
wherein light is permitted to pass unfiltered in a space between the plurality of colored portions,
wherein reflectance at a time of white display is between 26.5% and 27.5%, and
wherein chroma saturation at a time of display is R equal to 8.6-9.3, G equal to 7.3-8.0 and B equal to 10.3-11.5.

14. The method according to claim 13, wherein the colored portions are formed by an ink-jet method.

15. The method according to claim 14, wherein the binder resin comprises at least one curable resin selected from the group consisting of an acrylic resin, an epoxy resin, a novolac resin, and a melamine resin.

16. The method according to claim 14, wherein the binder resin has a mass average molecular weight in a range of from 500 to 10000.

17. The method according to claim 14, wherein the coloring composition has a non-volatile content in a range of from 10% to 40%.

18. The method according to claim 14, wherein the colored portions are formed such that the colored portions cover from 25% to 90% of an area of each of the driving units of the pixel electrode.

19. The method according to claim 14, wherein the colored portions are formed such that the colored portions cover from 50% to 70% of an area of each of the driving units of the pixel electrode.

20. The reflection-type display panel according to claim 1, wherein the color filter does not have a black matrix.

* * * * *